United States Patent [19]

Nakabayashi et al.

[11] Patent Number: 5,091,033
[45] Date of Patent: Feb. 25, 1992

[54] ADHESIVE FOR CERAMICS AND PROCESSES FOR THE BONDING OF CERAMICS USING SAME

[75] Inventors: Nobuo Nakabayashi, Chiba; Narimichi Honda, Yamaguchi; Mitsuo Nakamura, Tokyo; Takeshi Sakashita, Yamaguchi, all of Japan

[73] Assignee: Mitsui Sekiyu Kagaku Kogyo Kabushiki Kaisha, Tokyo, Japan

[21] Appl. No.: 623,508

[22] Filed: Dec. 7, 1990

Related U.S. Application Data

[62] Division of Ser. No. 59,762, Jun. 8, 1987, abandoned.

[30] Foreign Application Priority Data

Jun. 6, 1986 [JP] Japan .................................. 61-131193
Jun. 6, 1986 [JP] Japan .................................. 61-131194

[51] Int. Cl.$^5$ ................................................ C23C 8/20
[52] U.S. Cl. ...................................... 156/316; 156/327; 427/208.2; 427/208.4
[58] Field of Search ................................ 156/316, 327; 427/208.2, 208.4

[56] References Cited

U.S. PATENT DOCUMENTS

| | | | |
|---|---|---|---|
| 4,515,930 | 5/1985 | Omura et al. | 156/327 X |
| 4,537,940 | 8/1985 | Omura et al. | 156/327 X |
| 4,599,274 | 7/1986 | Ando et al. | 156/327 X |
| 4,731,982 | 3/1988 | Grant et al. | 156/327 X |

*Primary Examiner*—Joseph L. Schofer
*Assistant Examiner*—J. M. Reddick
*Attorney, Agent, or Firm*—Wenderoth, Lind & Ponack

[57] ABSTRACT

Adhesives for ceramics obtained as first adhesives for ceramics according to the invention are excellent in bond properties as well as in water resistance because they contain first acidic compounds such as organic carboxylic acids in addition to silane coupling agents, polymerizable monomers and polymerization catalysts. Further, adhesives for ceramics obtained as second adhesives for ceramics according to the invention are excellent in bond properties as well as in dependability and water resistance because they contain metal salts in addition to silane coupling agents, polymerizable monomers and polymerization catalysts. Furthermore, adhesives for ceramics obtained as third adhesives for ceramics according to the invention are excellent in bond properties as well as dependability and water resistance because they contain second acidic compounds selected from among metal salts and organic carboxylic acid anhydrides in addition to silane coupling agents, polymerizable monomers and polymerization catalysts.

22 Claims, No Drawings

ADHESIVE FOR CERAMICS AND PROCESSES FOR THE BONDING OF CERAMICS USING SAME

This is a divisional application of parent application Ser. No. 07/059,762, now abandoned, filed June 8, 1987.

FIELD OF THE INVENTION

This invention relates to adhesives for use in bonding together ceramics, particularly those destined for medical treatment, and/or in bonding them to other adherends and to processes for bonding ceramics, particularly those destined for medical treatment, together or bonding them to other adherends by the use of said adhesives.

BACKGROUND OF THE INVENTION

In these later days, ceramics of varied types have come to be used in a variety of industrial fields. Of these ceramics, those which are destined for medical treatment are expected to find their uses in such a field as the manufacture of artificial bone or dental treatment. Such ceramics destined for medical treatment as used in the field of dental treatment include dental porcelain materials (hereinafter simply called porcelain in certain cases) which consist essentially of silica or alumina and further contain modified oxides for improving melting point, sintering characteristics, color tone, etc. This porcelain has been used for manufacturing porcelain tooth, porcelain baked crown, jacket crown, etc. and, in addition thereto, utility as artificial tooth of the porcelain has now been under investigation.

Dental treatment using such porcelain has heretofore been practiced, for example, by first making a metallic crown so as to fit a decayed tooth after removing by scraping the decayed portion therefrom, putting together by baking the porcelain and metallic crown to make a porcelain baked crown, and covering the tooth with the porcelain baked crown. In that case, however, there was involved such problem that the procelain used sometimes breaks into pieces because it is hard and brittle, or because of being poor in its adhesion to metal, the porcelain baked comes off from the metallic crown. Where the porcelain broke into pieces, in particular, there was brought about such problem that an expensive porcelain baked crown must be made anew because broken pieces of the porcelain cannot be strongly joined together.

With the view of solving such problems as referred to above, there have been proposed adhesives which are alleged to have adhesiveness to porcelain. For example, "The Journal of the Japanese Society for Dental Materials and Devices", Vol. 3, No. 6, 739-746, discloses adhesives which are believed to be adhesive to porcelain, said adhesives comprising (i) silane coupling agents, (ii) polymerizable monomers such as 4-methacryloxyethyltrimellitic acid anhydride (hereinafter called 4-META for short in certain cases), (iii) polymerizable monomers such as methyl methacrylate (hereinafter called MMA for short in certain cases) and (iv) polymerization catalysts such as tributylboron (hereinafter called TBB in certain cases).

Although the adhesives referred to above are excellent in adhesion properties to a certain extent in comparison with conventionally proposed adhesives for porcelain much reliance cannot be placed thereon as their adhesive strength greatly varies according to the condition under which they are used and, moreover, they are not sufficient enough in respect of water resistance, and accordingly they have been in great need of further improved adhesion properties.

Extensive researches conducted intensely by the present inventors with the purpose of solving the above-mentioned problems associated with the prior art and of obtaining adhesives for ceramics excellent in adhesion properties which do not vary according to the conditions under which they are used and, moreover, excellent in water resistance, have resulted in completion of the present invention on the basis of their finding that such purpose may well be attained by adding to conventionally known adhesives for ceramics (i) a specific first acidic compound or (ii) a metal salt, or (iii) a metal salt and a specific second acidic compound.

OBJECT OF THE INVENTION

The present invention is intended to solve problems associated with the prior art as mentioned above, and a first object of the invention is to provide adhesives having excellent properties of sticking to ceramics such as porcelain and also excellent in water resistance.

A second object of the invention is to provide processes for the bonding of ceramics such as porcelain using adhesives as mentioned above.

SUMMARY OF THE INVENTION

A characteristic feature of a first adhesive for ceramics according to the present invention is that the adhesive contains as its components (a) a silane coupling agent, (b-1) at least one first acidic compound selected from the group consisting of organic carboxylic acids, organic carboxylic acid anhydrides, inorganic acids, organic sulfonic acids and organic phosphoric acids (c) a polymerizable monomer and (d) a polymerization catalyst, said silane coupling agent being present in an amount of at least 5% by weight based on the sum total weight of said components (a), (b-1), (c) and (d).

A characteristic feature of a second adhesive for ceramics according to the invention is that the adhesive contains as its components (a) a silane coupling agent, (b-2) a metal salt, (c) polymerizable monomer and (d) a polymerization catalyst.

Furthermore, a characteristic feature of a third adhesive for ceramics according to the invention is that the adhesive contains as its components (a) silane coupling agent, (b-2) a metal salt, (b-3) at least one second acidic compound selected from the group consisting of organic carboxylic acids and organic carboxylic acid anhydrides, inorganic acids, organic sulfonic acids and organic phosphoric acids (c) a polymerizable monomer and (d) a polymerization catalyst.

A first process of the present invention for bonding ceramics to an adherend by the use of a liquid containing (a) a silane coupling agent and (b-1) the aforesaid first acidic compound, and a mixture containing (c) a polymerizable monomer and (d) a polymerization catalyst, the amount of said silane coupling agent being at least 5% by weight based on the sum total weight of said components (a), (b-1), (c) and (d), has a characteristic feature that the process comprises the following steps;

(1) applying said liquid containing said components (a) and (b-1) to the surface of the ceramics, (2) drying the liquid thus applied to the surface of the ceramics to form a coat layer, (3) applying said mixture containing said components (c) and (d) to said coat layer, and (4) bonding said adherend to the surface of the thus treated ceramics.

A second process of the invention for bonding ceramics to an adherend by the use of a mixture containing (a) a silane coupling agent, (b-1) the aforesaid first acidic compound, (c) a polymerizable monomer and (d) a polymerization catalyst, the amount of said silane coupling agent being at least 5% by weight based on the sum total weight of said components (a), (b-1), (c) and (d), has a characteristic feature that the process involves the following steps;

(1) applying said mixture containing said components (a), (b-1), (c) and (d) to the surface of the ceramics, and (2) bonding said adherend to the surface of the thus treated ceramics.

A third process of the invention for bonding ceramics to an adherend by the use of a liquid containing (a) a silane coupling agent and (b-2) a metal salt, and a mixture containing (c) polymerizable monomer and (d) a polymerization catalyst, has a characteristic feature that the process involves the following steps;

(1) applying said liquid containing said components (a) and (b-2) to the surface of ceramics, (2) drying the liquid thus applied to the surface of the ceramics to form a coat layer, (3) applying said mixture containing said components (c) and (d) to said coat layer, and (4) bonding said adherend to the surface of the thus treated ceramics.

A fourth process of the invention for bonding ceramics to an adherend by the use of a liquid containing (a) silane coupling agent and (b-2) a metal salt, and a mixture containing (c) a polymerizable monomer, (d) a polymerization catalyst and (b-3) the aforesaid second acidic compound, has a characteristic feature that the process involves the following steps;

(1) applying said liquid containing said components (a) and (b-2) to the surface of the ceramics, (2) drying the liquid thus applied to the surface of the ceramics to form a coating layer, (3) applying said mixture containing said components (c), (d) and (b-3) to said coat layer, and (4) bonding said adherend to the surface of the thus treated ceramics.

A fifth process of the invention for bonding ceramics to an adherend by the use of a mixture containing (a) a silane coupling agent, (b-1) a metal salt, (b-2) the aforesaid second acidic compound if necessary, (c) a polymerizable monomer and (d) a polymerization catalyst, has a characteristic feature that the process involves the following steps;

(1) applying said mixture containing said components (a), (b-1), (b-2) if necessary, (c) and (d) to the surface of the ceramics, and (2) bonding said adherend to the surface of the thus treated ceramics.

The adhesives for ceramics of the present invention as illustrated above are excellent in adhesion properties as well as in dependability and water resistance.

DETAILED DESCRIPTION OF THE INVENTION

The adhesives for ceramics and processes for the bonding of ceramics using said adhesives are illustrated below in more detail.

The first adhesive for ceramics of the invention comprises (a) a silane coupling agent, (b-1) at least one first acidic compound selected from the group consisting of organic carboxylic acids, organic carboxylic acid anhydrides, inorganic acids, organic sulfonic acids and organic phosphoric acids, (c) a polymerizable monomer and (d) a polymerization catalyst.

The second adhesive for ceramics of the invention comprises (a) a silane coupling agent, (b-2) a metal salt, (c) a polymerizable monomer and (c) a polymerization catalyst.

Furthermore, the third adhesive for ceramics of the invention contains (b-3) at least one second acidic compound selected from the group consisting of organic carboxylic acids and organic carboxylic acid anhydrides in addition to the above-mentioned components (a), (b-2), (c) and (d).

Each of the above-mentioned components of the present adhesives are illustrated below in detail.

(a) Silane Coupling Agent

In the present invention, the silane coupling agents used are preferably those of the organic type. Concretely, useful silane coupling agents are, for example, vinyl trichlorosilane, vinyl triacetoxysilane, vinyl triethoxysilane, vinyl tri($\beta$-methoxyethoxy)silane, $\gamma$-methacryloxypropyl trimethoxysilane, $\gamma$-methacryloxypropyl tri(trimethylsiloxy)silane, $\gamma$-methacryloxypropyl pentamethyldisiloxane, $\beta$-(3,4-epoxycyclohexyl)ethyl trimethoxysilane, $\gamma$-glycidyloxyprophl trimethoxysilane, mercaptopropyl trimethoxysilane, $\gamma$-ureidopropyl triethoxysilane, etc. Of these silane coupling agents, those which are preferably used are $\gamma$-methacryloxypropyl trimethoxysilane, $\gamma$-methacryloxypropyl tri(trimethylsiloxy)silane and $\gamma$-methacryloxypropyl pentamethyl disiloxane.

Such silane coupling agents are preferably used after having been dissolved or dispersed in alcohols such as methanol, ethanol, etc., ketones such as acetone, methyl ethyl ketone, etc., or organic solvents such as methyl methacrylate which is a polymerizable monomer as will be mentioned later.

(b-1) First Acidic Compound

The first acidic compound used is at least one compound selected from among organic carboxylic acids, organic carboxylic acid anhydrides, inorganic acids, sulfonic acids and organic phosphoric acids.

As the organic carboxylic acids, there may be used any of unsaturated and saturated carboxylic acids. Such carboxylic acids include, for example, chromenic acid, linolic acid, undecenoic acid, cinnamic acid, sorbic acid, cumaric acid, maleic acid, citraconic acid, p-vinylbenzoic acid, 4-methacryloxyethyltrimellitic acid, etc.

Furthermore, there may also be used, for example, aliphatic carboxylic acids such as formic acid, acetic acid, propionic acid, butyric acid, valeric acid, lauric acid, stearic acid, pyruvic acid, methoxyacetic acid, acetoacetic acid, etc.; aromatic carboxylic acids such as benzoic acid, phenylacetic acid, salicylic acid, etc.; hydroxycarboxylic acids such as glycolic acid, lactic acid, etc.; dicarboxylic acids such as oxalic acid, succinic acid, adipic acid, tartaric acid, maleic acid, fumaric acid, phthalic acid, etc.; and vinylcarboxylic acids such as acrylic acid, methacrylic acid, vinylacetic acid, etc.

There may also be used anhydrides of the organic carboxylic acids as illustrated above.

As the inorganic acids, there may be used sulfuric acid, nitric acid, hydrochloric acid, phosphoric acid, hydrogen fluoride, hydrogen bromide, hydrogen iodide, pyrophosphoric acid, tripolyphosphoric acid, phosphonic acid, etc.

As the organic sulfonic acids, there may be used alkylsulfonic acids such as methanesulfonic acid, ethanesulfonic acid, etc., arylsulfonic acids such as benzenesulfonic acid, toluenesulfonic acid, naphthalenesulfonic acid, etc., polysulfonic acids such as benzenedisulfonic acid, toluenedisulfonic acid, etc., and vinylsulfonic acids such as styrenesulfonic acid, 2-acrylamide-2-methylpropanesulfonic acid, etc.

As the organic phosphoric acids, there may be used alkylphosphoric acids such as methylsulfonic acid, ethylsulfonic acid, etc., arylphosphonic acids such as phenylphosphonic acid, naphthylphosphonic acid, etc., acid phosphoric acid esters such as polyphosphoric acid, methylphosphoric acid, ethylphosphoric acid, phenylphosphoric acid, etc., and vinylphosphoric acids such as methacryloxyethylphosphoric acid, methacryloxyethylphenylphosphoric acid, etc.

The first acidic compounds as exemplified above are preferably used after having been dissolved or dispersed in alcohols such as methanol and ethanol, ketones such as acetone and methyl ethyl ketone, or organic solvents such as methyl methacrylate which is a polymerizable monomer as will be mentioned later.

(b-2) Metal Salt

Useful metal salts are ferric chloride ($FeCl_3$), magnesium chloride ($MgCl_2$), zinc chloride ($ZnCl_2$), aluminum chloride ($AlCl_3$), stannous chloride ($SnCl_2$), stannic chloride ($SnCl_4$), zirconium chloride ($ZnCl_4$), molybdenum chloride ($MoCl_5$), nickel chloride ($NiCl_2$), cobalt chloride ($CoCl_2$), cupric chloride ($CuCl_2$) and the like.

Such metal salts as exemplified above are preferably used after having been dissolved or dispersed in water, alcohols such as methanol and ethanol, ketones such as acetone and methyl ethyl ketone, or organic solvents such as methyl methacrylate which is a polymerizable monomer as will be mentioned later.

(b-3) Second Acidic Compound

The second acidic compound used is selected from the group consisting of organic carboxylic acids and organic carboxylic acid anhydrides. In the present adhesives for ceramics, however, this second acidic compound is not used singly but is used in combination with the aforesaid metal salt.

Useful organic carboxylic acids and organic carboxylic acid anhydrides include those which are the same as the first acidic compounds as aforesaid.

(c) Polymerizable Monomer

The polymerizable monomer is used in the adhesives for ceramics of the present invention. Widely usable polymerizable monomers for the purpose intended include vinyl compounds which are capable of polymerization.

Particularly useful compounds as the polymerizable monomers include those as exemplified hereinafter.

Halogenated vinyl compounds such as vinyl chloride and vinyl bromide; vinyl esters such as vinyl acetate and vinyl propionate; vinyl ethers such as methyl vinyl ether, ethyl vinyl ether and isobutyl vinyl ether; alkenyl benzenes such as styrene, vinyl toluene, α-methylstyrene, chloromethylstyrene and stilbene; alkyl esters or glycidyl esters of acrylic acid or methacrylic acid such as methyl acrylate, methyl methacrylate, ethyl methacrylate, butyl methacrylate, glycidyl methacrylate, 2-hydroxyethyl methacrylate and 3-hydroxypropyl methacrylate; diacrylic acid esters or dimethacrylic acid esters such as ethylene glycol, diethylene glycol, triethylene glycol, tetraethylene glycol, dipropylene glycol and butylene glycol; triacrylic acid esters or trimethacrylic acid esters such as trimethylolpropane and trimethylolethane; triacrylic acid esters or trimethacrylic acid esters of tetramethylolethane; tetraacrylic acid esters or tetramethacrylic acid esters of tetramethylolethane; bisphenol-A-dimethacrylate, bisphenol-A-diglycidylmethacrylate, 2,2-bis(4-methacryloxyethoxyphenyl)propane; acrylic acid, methacrylic acid, methacrylic acid anhydride, itaconic acid, maleic acid, maleic acid anhydride, p-methacryloxybenzoic acid, N-2-hydroxy-3-methacryloxypropyl-N-phenylglycine, 4-methacryloxyethyltrimellitic acid, 4-methacryloxyethyltrimellitic acid anhydride and the like.

Of these compounds exemplified above, preferable are acrylic or methacrylic acid esters such as methyl methacrylate and the like.

Furthermore, it is also preferable to use methyl methacrylate in combination with 4-methacryloxyethyltrimellitic acid anhydride.

(d) Polymerization Catalyst

Preferably usable as the polymerization catalysts are those which are capable of polymerizing and curing such polymerizable monomers as mentioned above at ordinary temperatures. Useful polymerization catalysts concretely include such compounds as listed below.

(1) Trialkylboron and analogues thereof

Usable as the trialkylboron are concretely triethylboron, tripropylboron, triisopropylboron, tri-n-butylboron, triisopropylboron, tri-n-amylboron, triisoamylboron, tri-sec-amylboron and the like. Furthermore, usable are trialkylboron homologues which are obtained by partial oxidation of the trialkylborons indicated above.

(2) Organic peroxides-amines mixture system

Without particular limitation, any organic peroxides are usable so long as they are usually used as polymerization initiators. For example, favorably used are dibenzoyl peroxide, dilauryl peroxide, di-tert-butyl peroxide, 2,5-dimethyl-2,5-di(tert-butylperoxy)hexane, tert-butyl hydroperoxide, tert-butylperoxybenzoate and the like.

As amines used in combination with the organic peroxides mentioned above, aromatic amines are preferably used. The aromatic amine referred to herein has at least one aryl group bonded to the nitrogen atom, and any of primary, secondary and tertiary amines is usable. Of these amines, particularly tertiary amines are preferred. Concretely, exemplified as the tertiary amines are aniline, toluidine, xylidine, phenylenediamine, N,N-dimethylaniline, N,N-diethylaniline, N,N-di(β-hydroxyethyl)aniline, N,N-dimethyltoluidine, N,N-diethyltoluidine, N,N-dimethylanisidine, N,N-diethylanisidine, N,N-dimethyl-t-butylaniline, N,N-diethyl-t-butylaniline, N,N-dimethyl-p-chloroaniline, diphenylamine, N,N-(β-hydroxyethyl)-p-toluidine and the like. Of these amines, preferable are such tertiary amines having at least one electron donative substituent at the p-position of benzene ring.

(3) Visible ray polymerization initiator

This visible ray polymerization initiators as used herein consist of α-ketocarbonyl compounds and amines or aromatic type nitrogen containing condensed ring compounds.

As α-ketocarbonyl compounds, there may be exemplified α-diketone, α-ketoaldehyde, α-ketocarboxylic acid, α-ketocarboxylic ester and the like. More particularly, there may be shown α-diketones such as diacetyl, 2,3-pentadione, 2,3-hexadione, benzyl, 4,4'-dimethoxybenzyl, 4,4'-diethoxybenzyl, 4,4'-oxybenzyl, 4,4'-dichlorobenzyl, 4-nitrobenzyl, α-naphthyl, β-naphthyl, camphorquinone and 1,2-cyclohexanedione, α-ketoaldehydes such as methylglyoxal and phenylglyoxal, pyruvic acid, benzoylformic acid, phenylpyruvic acid, methyl pyruvate, ethyl benzoylformate, methyl phenylpyruvate, butyl phenylpyruvate and the like. Among these α-ketocarbonyl compounds, α-diketones are preferably used from the stand point of stability. Of the α-diketones, particularly preferable are diacetyl, benzyl and camphorquinone.

As the amine which is used as one component of the visible ray polymerization initiators, aliphatic or aromatic amines are preferable. Particularly favorable aromatic amines are substituted aromatic amines represented by the general formula [I]

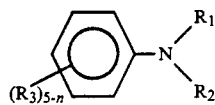

wherein $R_1$ represents hydrogen atom, alkyl or hydroxylalkyl, $R_2$ represents hydrogen atom, alkyl, hydroxylalkyl or aryl, and $R_3$ represents acyl, carboxy, alkoxycarbonyl, hydroxylacyl, carbamoyl which may have a substituent, cyano, nitro or halogen atom. Such substituted aromatic amines concretely include 4-dimethylaminobenzaldehyde, 4-diethylaminobenzaldehyde, 4-(methylphenylamino)benzaldehyde, 4-(β-hydroxyethylmethylamino)benzaldehyde, 4-dimethylaminobenzoic acid, 4-diethylaminobenzoic acid, 4-(methylphenylamino)benzoic acid, 4-(β-hydroxyethylamino)benzoic acid, methyl 4-dimethylaminobenzoate, methyl 4-diethylaminobenzoic acid, 4-(methylphenylamino)benzoate, propyl 4-(β-hydroxyethylamino)benzoate, phenyl 4-dimethylaminobenzoate, 4-dimethylphthalic acid, dimethyl 4-dimethylaminoisophthalate, N,N-dimethylcyanoaniline, N,N-dimethyl-chloroaniline, N,N-dimethyl-bromoaniline, N,N-dimethyl-o-iodoaniline, N,N-diethyl-cyanoaniline, N,N-diethyl-p-chloroaniline, N,N-dipropyl-p-cyanoaniline, N,N-methylphenyl-p-cyanoaniline, N,N-β-hydroxyethylmethyl-p-chloroaniline, N,N-dimethyl-2,4-dicyanoaniline, N,N-dimethyl-2,4-dinitroaniline, N,N-dimethyl-2,4-dinitroaniline, N,N-dimethyl-2,4-dichloroaniline and the like. Of these substituted aromatic amines, preferable are 4-dialkylaminobenzaldehydes, 4-dialkylaminobenzoic acids, 4-dialkylaminobenzoic acid esters and N,N-dialkyl-p-cyanoanilines, and particularly preferable are 4-diethylaminobenzoic acids.

Furthermore, as the aromatic type nitrogen containing condensed ring compound which is used as the other component of the visible ray polymerization initiator, favorable are those represented by the general formula [II]

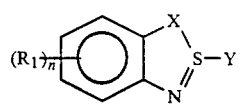

wherein X represents $-NR^2$, oxygen atom or sulfur atom, Y represents hydrogen atom, $-SR^3$ or monovalent to trivalent metal, $R^1$ represents alkyl, aryl, aralkyl or halogen atom, n represents an integer of from 0 to 4, when n is 2 or more $R^1$ may be the groups different from one another, $R^2$ represents hydrogen atom, alkyl, aryl or aralkyl, and $R^3$ represents alkyl, aryl or the group represented by the general formula [III]

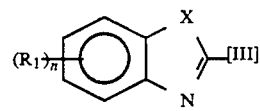

wherein X, $R^1$ and n are as defined above.

Concrete examples of such aromatic type nitrogen containing condensed ring compounds as illustrated above include 2-mercaptobenzimidazole, 2-mercaptobenzoxazole, 2-mercaptobenzothiazole, 2-mercaptomethylbenzimidazole, 2-mercaptobenzoxazole, 2-mercaptomethylbenzothiazole, dibenzoxazyl disulfide, dibenzothazyl disulfide, 2-(phenylthio)benzothiazole, and metal salts thereof, e.g. sodium salt, zinc (II) salt, copper (II) salt and nickel salt, 2-mercaptodimethylbenzimidazole, 2-mercaptodimethylbenzoxazole, 2-mercaptodimethylbenzothiazole, etc. Of these sulfur compounds, preferable are 2-mercaptobenzimidazole, 2-mercaptobenzoxazole, 2-mercaptobenzothiazole, 2-mercaptomethylbenzothiazole, dibenzothiazyldisulfide, zinc (II) salt of 2-mercaptobenzimidazole, zinc (II) salt of 2-mercaptobenzothiazole and zinc (II) salt of 2-mercaptomethylbenzothiazole. Particularly preferable are 2-mercaptobenzothiazole, 2-mercaptomethylbenzothiazole, zinc (II) salt of 2-mercaptobenzothiazole, and zinc (II) salt of 2-mercaptomethylbenzothiazole.

The adhesives for ceramics of the present invention are sometimes incorporated, if necessary, with polymers, fillers and stabilizers. Polymers which are incorporated in order to reduce polymerization contraction or to adjust viscosity include, for example, polymers or copolymers of monofunctional monomers such as polymethyl(meth)acrylate and polyethyl(meth)acrylate. Examples of the fillers are glass bead having a particle diameter of about 1-100 μm, alumina, α-quartz powder and colloidal silica. Useful stabilizers include hydroquinone monomethyl ether, t-butyl-p-cresol, hydroxymethoxybenzophenone, etc.

Furthermore, the adhesives for ceramics of the present invention can also be incorporated with aromatic sulfinates. Useful aromatic sulfinates are salts of alkali metals, alkaline earth metals or amines. Concretely, such salts include sodium benzenesulfinate, calcium benzenesulfinate, strontium benzenesulfinate, ammonium benzenesulfinate, benzenesulfinates such as benzenesulfinic acid triethylammonium salt and benzenesulfinic acid, N,N-dimethyl-p-toluidine salt, or salts of p-toluenesulfinic acid, β-naphthalenesulfinic acid, styrenesulfinic acid, etc.

In the first adhesives for ceramics of the present invention, the aforementioned components (a), (b-1), (c)

and (d) are preferably used in the following quantitative relationships.

(a) Silane Coupling Agent

The silane coupling agent is preferably used in an amount of at least 5%, preferably 5–15% by weight based on the sum total weight of the aforesaid components (a), (b-1), (c) and (d).

(b) First Acidic Compound

The first acidic compound is preferably used in an amount of 0.01–2% by weight based on the sum total weight of the aforesaid components (a), (b-1), (c) and (d).

(c) Polymerizable Monomer

The polymerizable monomer is preferably used in an amount of 95–43% based on the sum total weight of the aforesaid components (a), (b-1), (c) and (d).

(d) Polymerization Catalyst

The polymerization catalyst is preferably used in an amount of 0.01–43% by weight based on the sum total weight of the aforesaid components (a), (b-1), (c) and (d).

Furthermore, in the second adhesives for ceramics of the present invention, the components are preferably used in the following quantitative relationships.

(a) Silane Coupling Agent

The silane coupling agent is preferably used in an amount of 1–15% by weight based on the sum total weight of the components (a), (b-2), (c) and (d).

(b-2) Metal Salt

The metal salt is preferably used in an amount of 0.01–2% by weight based on the sum total weight of the components (a), (b-2), (b-3), (c) and (d).

(b-3) Second Acidic Compound

The second acidic compound is preferably used in an amount of 0.01–2% by weight based on the sum total weight of the aforesaid components (a), (b-2), (b-3), (c) and (d).

(c) Polymerizable Monomer

The polymerizable monomer is preferably used in an amount of 99–43% by weight based on the sum total weight of the aforesaid components (a), (b-2), (b-3), (c) and (d).

(d) Polymerization Catalyst

The polymerization catalyst is preferably used in an amount of 0.01–43% by weight based on the sum total weight of the aforesaid components (a), (b-2), (b-3), (c) and (d).

The processes for the bonding of ceramics using the aforesaid adhesives for ceramic according to the present invention are illustrated hereinafter.

A first process of the invention for bonding ceramics to an adherend by the use of a liquid containing (a) a silane coupling agent and (b-1) the aforesaid first acidic compound, and a mixture containing (c) a polymerizable monomer and (d) a polymerization catalyst, the amount of said silane coupling agent being at least 5% by weight based on the sum total weight of the aforesaid components (a), (b-1), (c) and (d), has a characteristic feature that the process involves the following steps;

(1) applying said liquid containing said components (a) and (b-1) to the surface of the ceramics, (2) drying the liquid thus applied to the surface of the ceramics to form a coat layer, (3) applying said mixture containing said components (c) and (d) to said coat layer, and (4) bonding said adherend to the surface of the thus treated ceramics.

More particularly, the above-mentioned step (1) is carried out, for example, by mixing a methyl methacrylate solution containing a silane coupling agent with an acetone solution containing a first acidic compound such as 4-methacryloxyethyltrimellitic acid or phosphoric acid, and applying the resulting mixture on the ceramic surface in such an amount that the amount of said silane coupling agent becomes at least 5% by weight based on the sum total weight of the aforementioned components (a), (b-1), (c) and (d).

The ceramic surface is preferably abraded and cleansed prior to applying the liquid containing a silane coupling agent and an acidic compound. Cleansing the ceramic surface is effected, for example, by subjecting said surface to ultrasonic cleaning in an organic solvent such as acetone.

The step (2) is effected, for example, by subjecting a liquid applied to the ceramic surface to air-drying followed by air blow.

The step (3) is effected by applying a liquid composition comprising a mixture of (c) a polymerizable monomer and (d) polymerization catalyst to a coat layer containing the silane coupling agent and acidic compound formed on the ceramic surface.

The step (4) is effected by press bonding an adherend to the ceramic surface thus treated or by placing the adherend on said ceramic surface. The adherend to be bonded to the ceramic surface is preferably such metal as stainless steel or iron, or such ceramics as porcelain.

A second process of the invention for bonding ceramics to an adherend by the use of a liquid composition comprising a mixture containing (a) a silane coupling agent, (b-1) the aforesaid first acidic compound, (c) a polymerizable monomer and (d) a polymerization catalyst, the amount of said silane coupling agent being at least 5% by weight based on the sum total weight of said components (a), (b-1), (c) and (d), has a characteristic feature that the process involves the following steps;

(1) applying said liquid composition comprising the mixture containing said components (a), (b-1), (c) and (d) to the surface of the ceramics, and (2) bonding said adherend to the surface of the thus treated ceramics.

In practicing this process for the bonding of ceramics, all the components mentioned above are first mixed together to prepare a liquid composition, the liquid composition thus prepared is applied to the ceramic surface and, if necessary the liquid composition thus applied to the ceramic surface is dried, thereafter an adherend such as ceramics or metal is bonded by press bonding to or placing on the thus coated ceramic surface.

A third process of the invention for bonding ceramics to an adherend by the use of a liquid containing (a) a silane coupling agent and (b-2) a metal salt, and a mixture containing (c) a polymerizable monomer and (d) a polymerization catalyst, has a characteristic feature that the process involves the following steps;

(1) applying said liquid containing said components (a) and (b-2) to the surface of ceramics, (2) drying the liquid thus applied to the surface of the ceramics to form a coat layer, (3) applying said mixture containing said components (c) and (d) to said coat layer, and (4) bonding said adherend to the surface of the thus treated ceramics.

More particularly, the step (1) is effected, for example, by applying to the ceramic surface a liquid prepared by mixing a methylmethacrylate solution containing a silane coupling agent with an acetone solution containing a metal salt such as ferric chloride.

The ceramic surface is preferably abraded and cleansed in the same manner as mentioned previously, prior to applying the liquid containing the silane coupling agent and metal salt. Cleansing of the ceramic surface is effected, for example, by subjecting said surface to ultrasonic cleaning in an organic solvent.

The step (2) is effected, for example, by subjecting a liquid applied to the ceramic surface to air-drying followed by air blow.

The step (3) is effected by applying a liquid composition comprising a mixture of (c) a polymerizable monomer and (d) a polymerization catalyst to a coat layer containing the silane coupling agent and metal salt formed on the ceramic surface.

The step (4) is effected by press bonding an adherend to the ceramic surface thus treated or by placing the adherend on said ceramic surface. The adherend to be bonded to the ceramic surface is preferably such metal as stainless steel or iron, or such ceramics as porcelain.

A fourth process of the invention for bonding ceramics to an adherend by the use of a liquid containing (a) a silane coupling agent and (b-2) a metal salt, and a mixture containing (c) a polymerizable monomer, (d) a polymerization catalyst and (b-3) the aforesaid second acidic compound, has a characteristic feature that the process involves the following steps;

(1) applying said liquid containing said components (a) and (b-2) to the surface of the ceramics, (2) drying the liquid thus applied to the surface of the ceramics to form a coat layer, (3) applying said mixture containing said components (c), (d) and (b-3) to said coat layer, and (4) bonding said adherend to the surface of the thus treated ceramics.

In this process for the bonding of ceramics, the same steps as in the third process mentioned above except for the step (3). Particularly, the step (3) is effected by dissolving the aforesaid acidic compound in the mixture of the polymerizable monomer and polymerization catalyst, and applying the resulting solution to the coat layer formed by the step (2).

A fifth process of the invention for bonding ceramics to an adherend by the use of a liquid composition comprising a mixture containing (a) a silane coupling agent, (b-2) a metal salt, (b-3) the aforesaid second acidic compound if necessary, (c) a polymerizable monomer and (d) a polymerization catalyst, has a characteristic feature that the process involves the following steps;

(1) applying said liquid composition comprising the mixture containing said components (a), (b-2), (b-3) if necessary, (c) and (d) to the surface of the ceramics, and (2) bonding said adherend to the surface of the thus treated ceramics.

The present invention is illustrated below with reference to examples, but it should be construed that the invention is in no way limited to those examples.

EXAMPLE 1

Dental ceramic powder (produced and sold by Vita Co. under a trade name of VMK 68) was molded into a block of 10 mm×10 mm×5 mm, and the block was then abraded on the surface thereof while showering with water to a level of Emery Paper #600. After having been washed with water for 1 minute, this sample was dried by air blow. An adhesive surface having a specified surface area was formed on the surface of the sample by quickly applying to the sample surface a cellophane adhesive tape of 0.1 mm in thickness having perforated a hole of 5 mm in diameter.

Subsequently, a 1:1 mixture of an MMA solution containing 6% by weight of $\gamma$-methacryloxypropyl trimethoxysilane as a silane coupling agent and an ethanol liquid containing 0.5% by weight of 4-methacryloxyethyl trimellitic acid as a first acidic compound was applied to the ceramic surface. Immediately after applying the mixture, the ceramic surface was subjected to air blow treatment to uniformly spread the coating film on the surface and the surplus coating film was removed therefrom and, at the same time, the coating film was dried.

On this adhesive surface was applied by the pencil-on technique a solution having mixed an MMA solution as a polymerizable monomer with a TBB solution as a polymerization catalyst therefor in the proportion of 12.5:1 (volume ratio) and MMA polymer in the weight proportion of 1-1.5:1. Subsequently, a stainless steel bar (SUS 304) having a tip portion diameter of 6 mm was bonded by built sticking technique to this adhesive surface. This adhesion test specimen was allowed to stand for 30 minutes followed by immersion for 24 hours in water kept at 37° C. The adhesion test specimen was then subjected 60 times to heat cycle treatment to keep for 1 minute at 4° C. then for 1 minute at 60° C., and adhesion force between the stainless steel and ceramics was measured by using a tensile strength tester Autograph IM-500 manufactured and sold by Shimadzu Seisakusho Ltd., at a speed of 2 mm/min. The measurement was conducted 6 times under the same conditions, and an average value of the measured values was taken as an adhesion strength. The adhesion strength was 247 kg/cm$^2$.

In the adhesive used in this example according to the above-mentioned procedure, the silane coupling agent is present in an amount of 6% by weight based on the sum total weight of the components (a), (b-1), (c) and (d) as defined in the present invention.

EXAMPLE 2

In the same procedure as in Example 1, the stainless steel bar was bonded to the ceramics by repeating Example 1 except that an MMA solution having dissolved therein 5% by weight of 4-META (4-methacryloxyethyltrimellitic acid anhydride) was used in place of the MMA solution as the polymerizable monomer, and adhesion force therebetween was measured.

An average value of adhesion strength was 314 kg/cm$^2$.

EXAMPLE 3

In the same procedure as in Example 1, the stainless steel bar was bonded to the ceramics by repeated Example 1 except that an ethanol solution containing 0.5% by weight of $H_3PO_4$ as the first acidic compound, and an MMA solution having dissolved therein 5% by weight of 4-META was used in place of the MMA solution as the polymerizable monomer, and adhesion force therebetween was measured.

An average value of the adhesion strength was 300 kg/cm$^2$.

EXAMPLE 4

In the same procedure as in Example 1, the stainless steel bar was bonded to the ceramics by repeating Example 1 except that 0.5% by weight of HCl was used as the first acidic compound, and an MMA solution having dissolved therein 5% by weight of 4-META was used in place of the MMA solution as the polymerizable monomer, and adhesion force therebetween was measured.

An average value of the adhesion strength was 296 kg/cm$^2$.

EXAMPLE 5

In the same procedure as in Example 1, the stainless steel bar was bonded to the ceramics by repeating Example 1 except that 0.5% by weight of H$_2$SO$_4$ was used as the first acidic compound, and an MMA solution having dissolved therein 5% by weight of 4-META was used in place of the MMA solution as the polymerizable monomer, and adhesion force therebetween was measured.

An average value of adhesion strength was 328 kg/cm$^2$.

COMPARATIVE EXAMPLE 1

In the same procedure as in Example 1, the stainless steel bar was bonded to the ceramics by repeating Example 1 except that the ethanol solution containing 4-methacryloxyethyltrimellitic acid as the first acidic compound was not used, and adhesion force therebetween was measured.

An average value of adhesion strength was 79 kg/cm$^2$.

COMPARATIVE EXAMPLE 2

In the same procedure as in Example 1, the stainless steel bar was bonded to the ceramics by repeating Example 1 except that the ethanol solution containing 4-methacryloxyethyltrimellitic acid as the first acidic compound was not used and an MMA solution having dissolved therein 5% by weight of 4-META in place of the MMA solution as the polymerizable monomer, and adhesion force therebetween was measured.

An average value of adhesion strength was 69 kg/cm$^2$.

COMPARATIVE EXAMPLE 3

In the same procedure as in Example 1, the stainless steel bar was bonded to the ceramics by repeating Example 1 except that an MMA solution containing 1% by weight of γ-methacryloxypropyl trimethoxysilane was used in place of the MMA solution containing 6% by weight of γ-methacryloxypropyl trimethoxysilane as the silane coupling agent, and adhesion force therebetween was measured.

An average value of adhesion strength was 150 kg/cm$^2$.

In the adhesive used in this example according to the above-mentioned manner, the silane coupling agent is present in an amount of 1% by weight based on the sum total weight of the components used in the adhesive of Example 1.

EXAMPLE 6

Dental ceramic powder (produced and sold by Vita Co. under a trade name of VMK 68) was molded into a block of 10 mm×10 mm×5 mm, and the block was then abraded on the surface thereof while showering with water to a level of Emery Paper #600. After having been washed with water for 1 minute, this sample was dried by air blow. An adhesive surface having a specified surface area was formed on the surface of the sample by quickly applying to the sample surface a cellophane adhesive tape of 0.1 mm in thickness having perforated a hole of 5 mm in diameter.

Subsequently, a 1:1 (volume ratio) mixture of an MMA solution containing 4% by weight of γ-methacryloxypropyl trimethoxysilane as a silane coupling agent and an ethanol liquid containing 0.5% by weight of FeCl$_3$ as a metal salt was applied to the ceramic surface to form a coating film. Immediately after applying, the ceramic surface was subjected to air blow treatment to uniformly spread the coating film and the surplus coating film was removed therefrom and, at the same time, the coating film was dried.

On this adhesive surface was applied by the pencil-on technique a solution having mixed MMA as a polymerizable monomer with TBB as a polymerization catalyst therefor in the proportion of 12.5:1 (volume ratio) and MMA polymer in the weight proportion of 1-1.5:1. Subsequently, a stainless steel bar (SUS 304) having a tip portion diameter of 6 mm was bonded by built sticking technique to this adhesive surface. This adhesion test specimen was allowed to stand for 30 minutes followed by immersion for 24 hours in water kept at 37° C. The adhesion test specimen was then subjected 60 times to heat cycle treatment to keep for 1 minute at 4° C. then for 1 minute at 60° C., and adhesion force between the stainless steel and ceramics was measured by using a tensile strength tester Autograph IM-500 manufactured and sold by Shimadzu Seisakusho Ltd., at a speed of 2 mm/min. The measurement was conducted 6 times under the same conditions, and an average value of the measured values was taken as an adhesion strength.

The adhesion strength was 380 kg/cm$^2$.

EXAMPLE 7

In the same procedure as in Example 6, the stainless steel bar was bonded to the ceramics by repeating Example 6 except that an MMA solution having dissolved therein 5% by weight of 4-META (4-methacryloxyethyltrimellitic acid anhydride) was used in place of the MMA solution as the polymerizable monomer, and adhesion force therebetween was measured.

An average value of adhesion strength was 400 kg/cm$^2$.

EXAMPLE 8

In the same procedure as in Example 6, the stainless steel bar was bonded to the ceramics by repeating Example 6 except that an ethanol solution containing 0.05% by weight of FeCl$_3$ as a metal salt was used and an MMA solution having dissolved therein 5% by weight of 4-META was used in place of the MMA solution as the polymerizable monomer, and adhesion force therebetween was measured.

An average value of adhesion strength was 363 kg/cm$^2$.

EXAMPLE 9

In the same procedure as in Example 6, the stainless steel bar was bonded to the ceramics by repeating Example 6 except that an ethanol solution containing 0.5% by weight of $ZnCl_2$ as a metal salt and an MMA solution having dissolved therein 5% by weight of 4-META was used in place of the MMA solution as the polymerizable monomer, and adhesion force therebetween was measured.

An average value of adhesion strength was 495 kg/cm$^2$.

EXAMPLE 10

In the same procedure as in Example 6, the stainless steel bar was bonded to the ceramics by repeating Example 6 except that an ethanol solution containing 0.5% by weight of $SnCl_2$ as a metal salt was used and an MMA solution having dissolved therein 5% by weight of 4-META was used in place of the MMA solution as the polymerizable monomer, and adhesion force therebetween was measured.

An average value of adhesion strength was 445 kg/cm$^2$.

EXAMPLE 11

In the same procedure as in Example 6, the stainless steel bar was bonded to the ceramics by repeating Example 6 except that an ethanol solution containing 0.5% by weight of $SnCl_4$ as a metal salt was used and an MMA solution having dissolved therein 5% by weight of 4-META was used in place of the MMA solution as the polymerizable monomer, and adhesion force therebetween was measured.

An average value of adhesion strength was 429 kg/cm$^2$.

EXAMPLE 12

In the same procedure as in Example 6, the stainless steel bar was bonded to the ceramics by repeating Example 6 except that an ethanol solution containing 0.5% by weight of $ZrCl_4$ as a metal salt was used and an MMA solution having dissolved therein 5% by weight of 4-META was used in place of the MMA solution as the polymerizable monomer, and adhesion force therebetween was measured.

An average value of adhesion strength was 282 kg/cm$^2$.

EXAMPLE 13

In the same procedure as in Example 6, the stainless steel bar was bonded to the ceramics by repeating Example 6 except that an ethanol solution containing 0.5% by weight of $MoCl_5$ as a metal salt was used and an MMA solution having dissolved therein 5% by weight of 4-META was used in place of the MMA solution as the polymerizable monomer, and adhesion force therebetween was measured.

An average value of adhesion strength was 287 kg/cm$^2$.

EXAMPLE 14

In the same procedure as in Example 6, the stainless steel bar was bonded to the ceramics by repeating Example 6 except that a mixture system of dibenzoyl peroxide and N,N-dimethyl-o-toluidine was used as a polymerization catalyst in place of the TBB as the polymerization catalyst, and adhesion force therebetween was measured.

An average value of adhesion strength was 200 kg/cm$^2$.

EXAMPLE 15

In the same procedure as in Example 6, the stainless steel bar was bonded to the ceramics by repeating Example 6 except that a mixture system of dibenzoyl peroxide and N,N-dimethyl-p-toluidine was used as a polymerization catalyst in place of the TBB as the polymerization catalyst and an MMA solution having dissolved therein 5% by weight of 4-META was used in place of the MMA solution as the polymerizable monomer, and adhesion force therebetween was measured.

An average value of adhesion strength was 210 kg/cm$^2$.

COMPARATIVE EXAMPLE 4

In the same procedure as in Example 6, the stainless steel bar was bonded to the ceramics by repeating Example 6 except that the ethanol solution containing $FeCl_3$ as the metal salt was not used, and adhesion force therebetween was measured.

An average value of adhesion strength was 79 kg/cm$^2$.

COMPARATIVE EXAMPLE 5

In the same procedure as in Example 6, the stainless steel bar was bonded to the ceramics by repeating Example 6 except that the ethanol solution containing $FeCl_3$ as the metal salt was not used and an MMA solution having dissolved therein 5% by weight of 4-META was used in place of the MMA solution as the polymerizable monomer, and adhesion force therebetween was measured.

An average value of adhesion strength was 69 kg/cm$^2$.

COMPARATIVE EXAMPLE 6

In the same procedure as in Example 6, the stainless steel bar was bonded to the ceramics by repeating Example 6 except that no silane coupling agent was used and an MMA solution having dissolved therein 5% by weight of 4-META was used in place of the MMA solution as the polymerizable monomer, and adhesion force therebetween was measured.

An average value of adhesion strength was 76 kg/cm$^2$.

EXAMPLE 16

In the same procedure as in Example 6, the stainless steel bar was bonded to the ceramics by repeating Example 6 except that feldspar for artificial tooth was used in place of VMK 68 and an MMA solution having dissolved therein 5% by weight of 4-META was used in place of the MMA solution as the polymerizable monomer, and adhesion force therebetween was measured.

An average value of adhesion strength was 340 kg/cm$^2$.

EXAMPLE 17

In the same procedure as in Example 6, the stainless steel bar was bonded to the ceramics by repeating Example 6 except that silicon nitride was used in place of VMK 68 and an MMA solution having dissolved therein 5% by weight of 4-META was used in place of the MMA solution as the polymerizable monomer, and adhesion force therebetween was measured.

An average value of adhesion strength was 350 kg/cm².

What is claimed is:

1. A process for bonding ceramics to an adherend using a liquid containing (a) a silane coupling agent and (b-1) at least one first acidic compound selected from the group consisting of organic carboxylic acids, organic carboxylic acid anhydrides, inorganic acids, organic sulfonic acids and organic phosphoric acids, and a mixture containing (c) a polymerizable monomer and (d) a polymerization catalyst, the amount of said silane coupling agent being at least 5% by weight based on the sum total weight of said components (a), (b-1), (c) and (d), which process involves the following steps of
    (1) applying said liquid containing said components (a) and (b-1) to the surface of the ceramics,
    (2) drying the liquid thus applied to the surface of the ceramics to form a coat layer,
    (3) applying said mixture containing said components (c) and (d) to said coat layer, and
    (4) bonding said adherend to the surface of the thus treated ceramics.

2. The process as claimed in claim 1 wherein the adherend is a metal or ceramics.

3. The process as claimed in claim 1 wherein the silane coupling agent is γ-methacryloxypropyl trimethoxysilane, γ-methacryloxypropyl tri(trimethylsiloxy)silane or γ-methacryloxypropyl pentamethyldisiloxane.

4. The process as claimed in claim 1 wherein the first acidic compound is 4-methacryloxyethyltrimellitic acid.

5. The process as claimed in claim 1 wherein the first acidic compound is an inorganic phosphoric acid.

6. The process as claimed in claim 1 wherein the polymerizable monomer is methyl methacrylate.

7. The process as claimed in claim 1 wherein the polymerizable monomer consists of methyl methacrylate and 4-methacryloxyethyltrimellitic acid anhydride.

8. The process as claimed in claim 1 wherein the polymerization catalyst is trialkylboron or its oxide, or a mixture system of organic peroxides and amines.

9. A process for bonding ceramics to an adherend using a liquid containing (a) a silane coupling agent and (b-2) a metal salt, and a mixture containing a polymerizable monomer and a polymerization catalyst, which process involves the following steps of
    (1) applying said liquid containing said components (a) and (b-2) to the surface of the ceramics,
    (2) drying the liquid thus applied on the surface of the ceramics to form a coat layer,
    (3) applying said mixture containing said polymerizable monomer and said polymerization catalyst to said coat layer, and
    (4) bonding said adherend to the surface of the thus treated ceramics.

10. The process as claimed in claim 9 wherein the adherend is metal or ceramics.

11. The process as claimed in claim 9 wherein the silane coupling agent is γ-methacryloxypropyl trimethoxysilane, γ-methacryloxypropyl tri(trimethylsiloxy)silane or γ-methacryloxypropyl pentamethyldisiloxane.

12. The process as claimed in claim 9 wherein the metal salt is ferric chloride, magnesium chloride, zinc chloride, aluminum chloride, stannous chloride, stannic chloride, molybdenum chloride, nickel chloride, cupric chloride or cobalt chloride.

13. The process as claimed in claim 9 wherein the polymerizable monomer is methyl methacrylate.

14. The process as claimed in claim 9 wherein the polymerizable monomer consists of methyl methacrylate and 4-methacryloxyethyltrimellitic acid anhydride.

15. The process as claimed in claim 9 wherein the polymerization catalyst is trialkylboron or its oxide, or a mixture system of organic peroxides and amines.

16. A process for bonding ceramics to an adherend using a liquid containing (a) a silane coupling agent and (b-2) a metal salt, and a mixture containing (c) a polymerizable monomer, (d) a polymerization catalyst and (b-3) at least one second acidic compound selected from the group consisting of organic carboxylic acids and organic carboxylic acid anhydrides, which process involves the following steps of
    (1) applying said liquid containing said components (a) and (b-2) to the surface of the ceramics,
    (2) drying the liquid thus applied to the surface of the ceramics to form a coat layer,
    (3) applying said mixture containing said components (c), (d) and (b-3) to said coat layer, and
    (4) bonding said adherend to the surface of the thus treated ceramics.

17. The process as claimed in claim 16 wherein the adherend is metal or ceramics.

18. The process as claimed in claim 16 wherein the silane coupling agent is γ-methacryloxypropyl trimethoxysilane, γ-methacryloxypropyl tri(trimethylsiloxy)silane or γ-methacryloxypropyl pentamethyldisiloxane.

19. The process as claimed in claim 16 wherein metal salt is ferric chloride, magnesium chloride, zinc chloride, aluminum chloride, stannous chloride, stannic chloride, zirconium chloride, molybdenum chloride, nickel chloride, cupric chloride or cobalt chloride.

20. The process as claimed in claim 16 wherein the polymerizable monomer is methyl methacrylate.

21. The process as claimed in claim 16 wherein the polymerizable monomer consists of methyl methacrylate and 4-methacryloxyethyltrimellitic acid anhydride.

22. The process as claimed in claim 16 wherein the polymerization catalyst is trialkylboron or its oxide, or a mixture system of organic peroxides and amines.

* * * * *